UNITED STATES PATENT OFFICE.

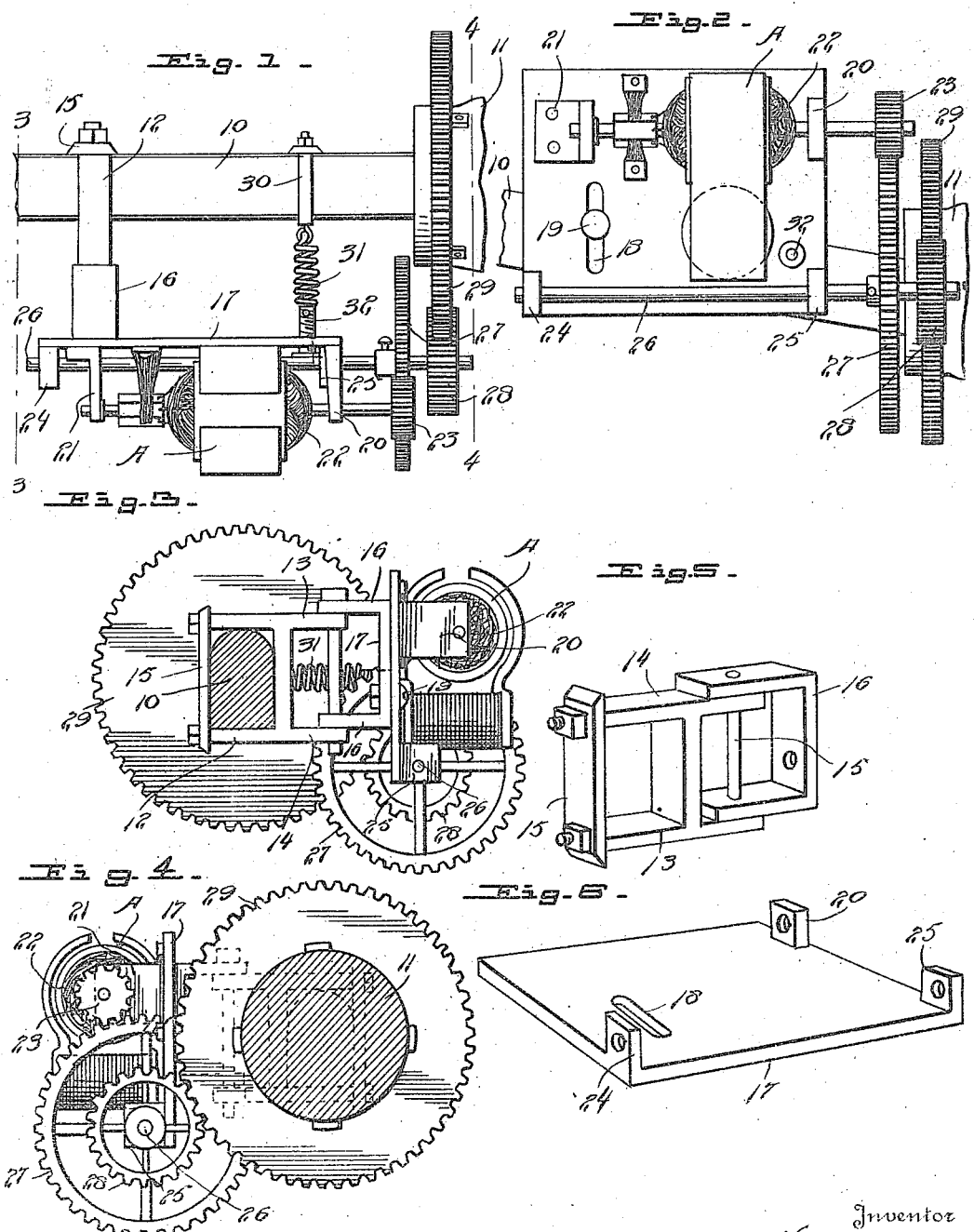

HENRY L. WOHLERS, OF OAKHARBOR, OHIO.

VEHICLE LIGHTING SYSTEM.

1,157,748.

Specification of Letters Patent. Patented Oct. 26, 1915.

Application filed March 30, 1914. Serial No. 828,324.

*To all whom it may concern:*

Be it known that I, HENRY L. WOHLERS, a citizen of the United States, residing at Oakharbor, in the county of Ottawa, State of Ohio, have invented certain new and useful Improvements in Vehicle Lighting Systems; and I do hereby declare the following to be a full, clear, and exact description of the invention, such as will enable others skilled in the art to which it appertains to make and use the same.

This invention relates to vehicle lighting systems and particularly to mechanism for driving the generator or dynamo of the system.

The object of the invention resides in the provision of an improved construction of mechanism for operating the generator or dynamo of a vehicle lighting system through the medium of the rotation of the hub of a vehicle wheel as said vehicle is drawn along the ground.

A further object of the invention resides in the provision of a mechanism of the character referred to which can be readily associated with any horse drawn vehicle and when so associated will prove efficient and durable.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of the invention showing same applied to the axle of a vehicle and operatively connected with the hub of the adjacent traction wheel; Fig. 2, a front view of what is shown in Fig. 1; Fig. , a section on the line 3—3 of Fig. 1; Fig. a section on the line 4—4 of Fig. 1; Fig. 5, perspective view of the supporting clip d pivoted bracket carried thereby, and ig. , a perspective view of the base plate on which the dynamo is mounted, the namo being removed for the sake of clearss.

Referring to the drawings 10 indicates the le of a vehicle and 11 the hub of a wheel atably mounted on said axle. Secured to axle 10 is a clip 12 provided with spaced ears 13 and 14. The ears 13 and 14 are connected by a rod 15 upon which is pivotally mounted a U-shaped bracket 16 having one arm engaged against the upper side of the ear 13 and its other arm engaged against the upper side of the ear 14. The invention further comprises a base plate 17 having a slot 18 therein. Engaged through the slot 18 and the arm connecting portion of the bracket 16 is a bolt 19 whereby the plate 17 is secured to said bracket. Mounted upon the plate 17 adjacent the upper edge thereof are space brackets 20 and 21 in which is journaled the armature 22 of a dynamo A, said dynamo being of any desired type suitable for the service to be performed thereby. One of the trunnions of the armature 22 is extended through the bearing 20 and has fixed thereon a gear 23 for a purpose that will presently appear. Formed on the plate 17 on each side thereof and at its lower edge are journal bearings 24 and 25, and rotatably mounted in these bearings is a shaft 26 having fixed thereon a gear 27 meshing with the gear 23. Also fixed on the shaft 26 is a gear 28 which meshes with a gear 29 fixed on the hub 11. Secured to the axle 10 between the clip 12 and the hub 11 is a clip 30 which has secured thereto one end of a spring 31. The other end of this spring 31 is secured to an adjusting screw 32 threaded in the plate 17 and through the manipulation of which the tension of the spring 31 may be varied. The spring 31 serves to yieldingly hold the gear 28 in mesh with the gear 29 so as to allow for any irregular movement of the gear 29.

The dynamo A may be connected in the usual manner to a suitable storage battery carried at any convenient point on the vehicle of which the axle 10 forms a part.

What is claimed:—

1. In a device of the class described the combination of an axle, an element rotatable thereon, a clip secured to said axle, a bracket pivoted on the clip, a base plate secured to said bracket, a dynamo mounted upon the base plate, a shaft journaled on said base plate, connections between the shaft and dynamo, a gear fixed on said shaft, a gear fixed on said rotatable element meshing with the gear on the shaft, and means for yieldingly holding the gear on the shaft in mesh with the gear on the rotatable element.

2. In a device of the class described, the combination of an axle, an element rotatable thereon, a clip secured to said axle, a bracket pivoted on the clip, a base plate secured to said bracket, a dynamo mounted on the base plate, a shaft journaled on said base plate, connections between the shaft and dynamo, a gear fixed on said shaft, a gear fixed on said rotatable element, and a spring connection between the base plate and the axle for yieldingly holding the gear on the shaft in mesh with the gear on the rotatable element.

In testimony whereof, I affix my signature, in the presence of two witnesses.

HENRY L. WOHLERS.

Witnesses:
HENRY WOHLERS, Sr.,
W. E. FLECKNER.